(12) United States Patent
Sun et al.

(10) Patent No.: US 12,335,625 B2
(45) Date of Patent: Jun. 17, 2025

(54) AUTOMATIC TARGET IMAGE ACQUISITION AND CALIBRATION SYSTEM FOR INSPECTION

(71) Applicants: Kapito Inc., Hsinchu (TW); Feng-Tso Sun, Hsinchu (TW); Yi-Ting Yeh, Hsinchu (TW); Feng-Yu Sun, Hsinchu (TW)

(72) Inventors: Feng-Tso Sun, Hsinchu (TW); Yi-Ting Yeh, Hsinchu (TW); Feng-Yu Sun, Hsinchu (TW); Jyun-Tang Huang, Hsinchu (TW); Rong-Hua Chang, Hsinchu County (TW); Yi-Hsiang Tien, Nantou County (TW); Meng-Tse Shen, Hsinchu (TW)

(73) Assignees: KAPITO INC., Hsinchu (TW); Feng-Tso Sun, Hsinchu (TW); Ying-Ting Yeh, Hsinchu (TW); Feng-Yu Sun

( * ) Notice: Subject to any disclaimer, the term of this patent is extended or adjusted under 35 U.S.C. 154(b) by 132 days.

(21) Appl. No.: 18/451,264

(22) Filed: Aug. 17, 2023

(65) Prior Publication Data
US 2024/0073531 A1    Feb. 29, 2024

(30) Foreign Application Priority Data
Aug. 24, 2022   (TW) .................................. 111131924

(51) Int. Cl.
*B25J 9/16*   (2006.01)
*B25J 11/00*  (2006.01)
(Continued)

(52) U.S. Cl.
CPC ............ *H04N 23/695* (2023.01); *B25J 11/00* (2013.01); *B65G 47/52* (2013.01); *G01N 21/84* (2013.01);
(Continued)

(58) Field of Classification Search
CPC ...... B25J 9/0084; B25J 9/0093; B25J 19/023; B25J 11/00; B25J 9/1679; B25J 9/1697;
(Continued)

(56) References Cited

U.S. PATENT DOCUMENTS

2011/0298939 A1* 12/2011 Melikian ............... G06V 10/462
    348/222.1
2017/0080566 A1*  3/2017 Stubbs ................. G06Q 10/087
(Continued)

*Primary Examiner* — Howard D Brown, Jr.
(74) *Attorney, Agent, or Firm* — ANOVA LAW GROUP, PLLC

(57) ABSTRACT

An automatic target image acquisition and calibration system for application in a defect inspection system is disclosed. During the defect inspection system working normally, the automatic target image acquisition and calibration system is configured to find a recognition structure from an article under inspection, and then determines a relative position and a relative 3D coordinate if the article. Therefore, a robotic arm is controlled to carry a camera to precisely face each of a plurality of inspected surfaces of the article, such that a plurality of article images are acquired by the camera. It is worth explaining that, during the defect inspection of the article, there is no need to modulate an image acquiring height and an image acquiring angle of the camera and an illumination of a light source.

10 Claims, 5 Drawing Sheets

(51) Int. Cl.
*B65G 47/52* (2006.01)
*G01N 21/84* (2006.01)
*G06T 7/00* (2017.01)
*G06V 10/40* (2022.01)
*G06V 10/75* (2022.01)
*G06V 20/50* (2022.01)
*H04N 23/56* (2023.01)
*H04N 23/695* (2023.01)

(52) U.S. Cl.
CPC .............. *G06T 7/001* (2013.01); *G06V 10/40* (2022.01); *G06V 10/751* (2022.01); *G06V 20/50* (2022.01); *H04N 23/56* (2023.01); *G01N 2021/845* (2013.01); *G06T 2207/30108* (2013.01)

(58) Field of Classification Search
CPC .... B65G 47/53; B65G 47/904; B65G 47/915; B65G 2203/041; B65G 47/52; G06T 2207/10016; G06T 2207/30164; G06T 7/001; G06T 2207/30108; G06V 2201/06; G06V 10/40; G06V 10/751; G06V 20/50; G06V 10/141; H04N 23/695; H04N 23/56; G01N 21/84; G01N 2021/845; G01N 2021/8887; G01N 21/8851; G05B 19/41875; G05B 2219/37208; G05B 2219/40564; G05B 2219/45066
See application file for complete search history.

(56) References Cited

U.S. PATENT DOCUMENTS

| | | | |
|---|---|---|---|
| 2017/0154234 A1* | 6/2017 | Tanaka | G06T 7/001 |
| 2017/0330315 A1* | 11/2017 | Okuda | G01N 21/8851 |
| 2018/0250826 A1* | 9/2018 | Jiang | G06V 10/25 |
| 2019/0005329 A1* | 1/2019 | Misra | G06N 3/006 |

* cited by examiner

AUTOMATIC TARGET IMAGE ACQUISITION AND CALIBRATION SYSTEM FOR INSPECTION

CROSS-REFERENCE TO RELATED APPLICATION

This application claims the priority of Taiwan Patent Application No. 111131924, filed on Aug. 24, 2022, the content of which is incorporated by reference in its entirety.

TECHNICAL FIELD

The present invention relates to the technology field of machine vision, and more particularly to an automatic target image acquisition and calibration system for application in a defect inspection system.

BACKGROUND

In general, industrially made products and/or semi-finished products need to receive and pass a quality inspection consisting of a cosmetic test and a function test before being shipped out to the costumer end. During the conduction of the cosmetic test, visual inspections for a top surface, a bottom surface, a left surface, a right surface, a front surface, and a bottom surface of an industrially made article (i.e., a product or a semi-finished product) are carried out by an inspector according to international testing standards. However, practical experiences reveal that the inspector often has missed inspection and/or false inspection in case of conducting the visual inspections for the industrially made article. Accordingly, automated optical inspection (AOI) system using machine vision technology is developed so as to be implemented in an automatic production line, thereby replacing the inspectors to accomplish each industrially made article's cosmetic test.

For example, FIG. 1 illustrates a schematic stereo diagram of a conventional hex nut inspection system. As FIG. 1 shows, the hex nut inspection system 1a principally comprises: a transfer unit 11a, a plurality of camera 12a and an electronic device 13a, wherein each camera 12a is fixed on a support mechanism 14a. It is easy to understand that, the camera 12a can be set to have a specific image acquiring height and a specific image acquiring angle by manually adjusting the support mechanism 14a.

AOI engineers skilled in design and manufacture of the hex nut inspection system 1a commonly know that, re-setting or modulating the image acquiring height and the image acquiring angle of each camera 12a is needed before using the hex nut inspection system 1a to conduct the defect inspection of specific hex nuts with product model A. In addition, if necessary, illumination provided by a light source is also re-designed or modulated by the AOI engineers. In other words, if nuts manufacturer has the requirement to use the hex nut inspection system 1a to conduct the defect inspection of another hex nuts with product model B, the AOI engineers still need to re-set or modulate the image acquiring height and the image acquiring angle of the camera 12a and the illumination of the light source.

However, practical experiences reveals that it is not an easy job to re-set or modulate the image acquiring height and the image acquiring angle of the camera 12a and the illumination of the light source. For this reason, to develop a specific system for application in a defect inspection system should be considered, wherein the specific system is able to automatically modulate the image acquiring height, the image acquiring angle and the illumination according to a target industrially made article (i.e., product or semi-finished product).

Accordingly, inventors of the present application have made great efforts to make inventive research and eventually provided an automatic target image acquisition and calibration system for application in a defect inspection system.

SUMMARY

The primary objective of the present invention is to provide an automatic target image acquisition and calibration system for application in a defect inspection system. During the operation of the automatic target image acquisition and calibration system, an electronic device is configured to control a first robotic arm to turn over an article in a rotation sequence, and then to control a first camera to acquire a plurality of 2D images from the article during the article being turned over. Subsequently, after finding a recognition structure from at least one said 2D image, the electronic device determines a relative position and a relative 3D coordinate of the article, controls a second robotic arm to grasp a second camera, and controls the second robotic arm to move the second camera to face N surfaces of the article by N times, respectively, such that the second camera acquires N article images from the article. Consequently, the electronic device applies a defect inspection process to each said article image, so as to determine whether there is at least one defective feature existing in at least one said article image.

In brief, during the defect inspection system working normally, the automatic target image acquisition and calibration system is configured to find a recognition structure from an article under inspection, and then determines a relative position and a relative 3D coordinate if the article. Therefore, a robotic arm is controlled to carry a camera to precisely face each of a plurality of inspected surfaces of the article, such that a plurality of article images are acquired by the camera. It is worth explaining that, during the defect inspection of the article, there is no need to modulate an image acquiring height and an image acquiring angle of the camera and an illumination of a light source.

For achieving the primary objective mentioned above, the present invention provides an embodiment of the automatic target image acquisition and calibration system, comprising: a first camera disposed near the first robotic arm, at least one second robotic arm disposed near the second conveyor for grasping at least one second camera, and an electronic device coupled to the first robotic arm, the first camera, the at least one second robotic arm, and the at least one second camera. The electronic device comprises a processor and a memory, wherein the memory stores an application program, and the processor accesses the memory so as to execute the application program. When the application program is executed, the processor being configured to: (1) control the first robotic arm to grasp one article from the first conveyor, move the article to be in a first photographing region of the first camera, and turn over the article in a rotation sequence; (2) control the first camera to acquire a plurality of 2D images from the article during the article being turned over; (3) apply a feature recognition process to the plurality of 2D images, so as to find at least one 2D image including a recognition feature pattern; (4) control the first robotic arm to move the article to the second conveyor, and determine a relative position and a relative 3D coordinate of the article based on the recognition feature pattern and the plurality of 2D images; (5) conduct a camera moving operation, so as to control the robotic arm to move the second camera to make one of N inspection surfaces of the article be in a second photographing region of the second camera, where N is an integer; (6) conduct a photographing operation, so as to control the second camera to photograph the inspection surface of the article, thereby obtaining one article image; (7) repeat the foregoing camera moving operation and the foregoing photographing operation N−1 times, so as to obtain a total of N article images; (8) apply a feature extracting process to the N article images so as to generate N feature images; and (9) conduct a feature matching operation, so as to determine whether said feature image contains at least one defect feature that matches at least one of a plurality of reference defect features.

In one embodiment, the automatic target image acquisition and calibration system further comprises a first light source coupled to the electronic device so as to be controlled to radiate a first illumination light to the first photographing region. The system further comprises a second light source coupled to the electronic device, and the second light is controlled by the electronic device so as to radiate a second illumination light to the second photographing region.

In one practicable embodiment, the recognition structure is a tag selected from the group consisting of 2D barcode tag, QR code tag, matrix barcode tags, patterns-containing tag, text-containing tag, alphabets-containing tags, and digits-containing tag.

In one embodiment, the tag is adopted for storing an article information comprising vendor ID, product ID, serial number, and batch/lot number.

In another one practicable embodiment, the recognition structure is a structural feature of the article.

In one embodiment, the application program comprises instructions, and the processor executes the instructions so as to be configured to establish a 3D image of the article based on the recognition feature pattern and the plurality of 2D images, and then to determine the relative position and the relative 3D coordinate of the article.

In one embodiment, the instructions include a mathematical algorithm selected from the group consisting of Delaunay triangulation algorithm, Crust triangulation algorithm, and triangulated irregular network (TIN) algorithm.

In one embodiment, the application program includes a plurality of subprograms, and the plurality of subprograms comprise: a first subprogram, being compiled to be integrated in the application program by one type of programming language, and including instructions for configuring the processor to control the first robotic arm to grasp one article from the first conveyor, move the article to be in the first photographing region of the first camera, and turn over the article in said rotation sequence, and configuring the processor to control the first robotic arm to move the article to the second conveyor; a second subprogram, being compiled to be integrated in the application program by one type of programming language, and including instructions for configuring the processor to control the first camera to acquire the plurality of 2D images from the article during the article being turned over; a third subprogram, being compiled to be integrated in the application program by one type of programming language, and including instructions for configuring the processor to apply the feature recognition process to the plurality of 2D images, so as to find at least one 2D image including the recognition feature pattern; a fourth subprogram, being compiled to be integrated in the application program by one type of programming language, and including instructions for configuring the processor to establish a 3D image of the article based on the recognition feature pattern and the plurality of 2D images, and then to determine the relative position and the relative 3D coordinate of the article; a fifth subprogram, being compiled to be integrated in the application program by one type of programming language, and including instructions for configuring the processor to control the robotic arm to move the second camera, thereby making one of N inspection surfaces of the article be in the second photographing region of the second camera; a six subprogram, being compiled to be integrated in the application program by one type of programming language, and including instructions for configuring the processor to control the second camera to photograph the inspection surface of the article, thereby obtaining one article image; and a seventh subprogram, being compiled to be integrated in the application program by one type of programming language, and including instructions for configuring the processor to apply the feature extracting process to the N article images, and then to determine whether said feature image contains at least one defect feature that matches at least one of a plurality of reference defect features.

In one practicable embodiment, the electronic device is further coupled to an apparatus controlling device that is used for controlling the first conveyor and the second conveyor.

In another one practicable embodiment, the electronic device is integrated in an apparatus controlling device that is used for controlling the first conveyor and the second conveyor.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe an automatic target image acquisition and calibration system according to the present invention, embodiments of the present invention will be described in detail with reference to the attached drawings hereinafter.

Figure 1:
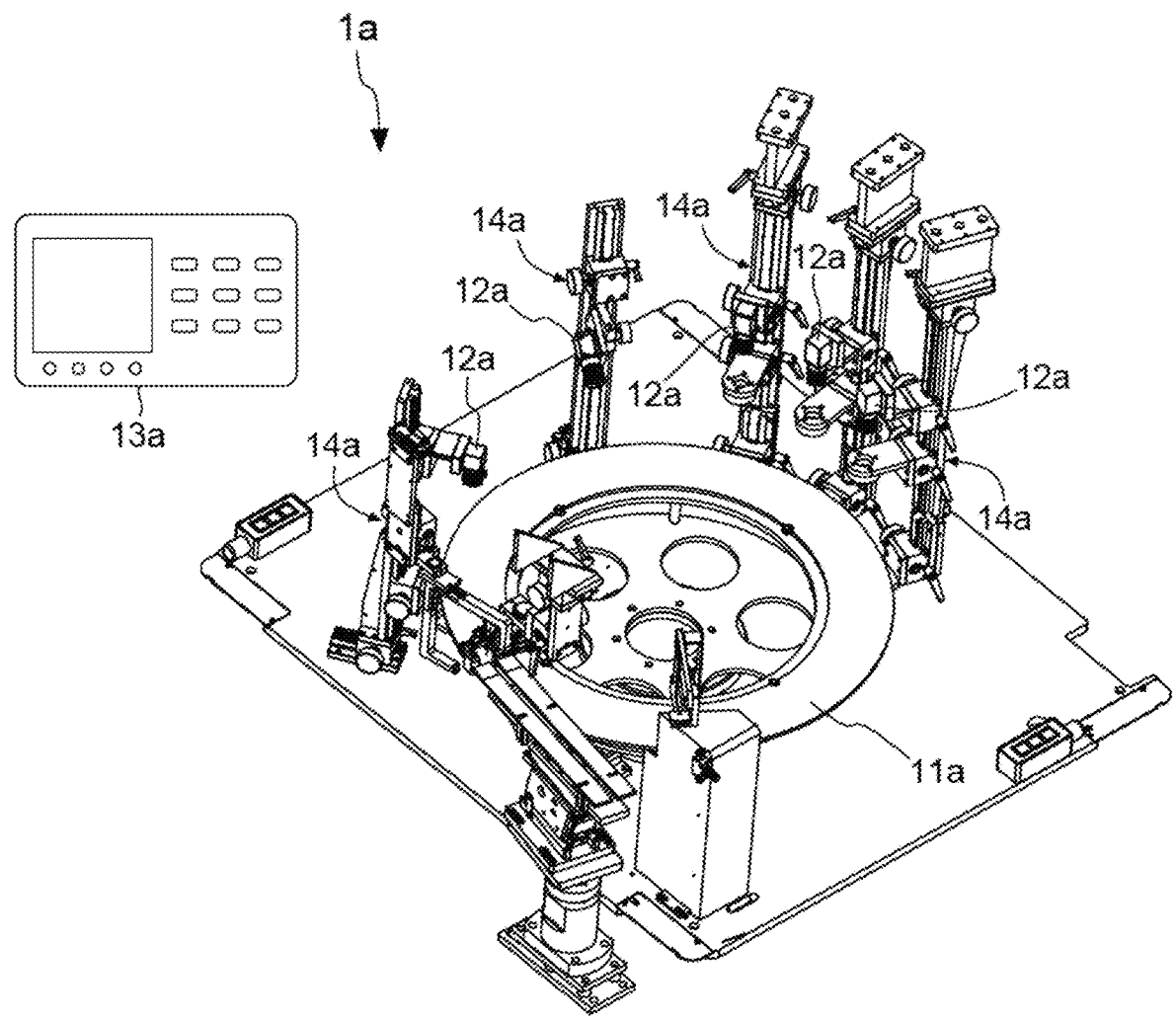
FIG. 1 shows a schematic stereo diagram of a conventional hex nut inspection system.
Figure 2A:
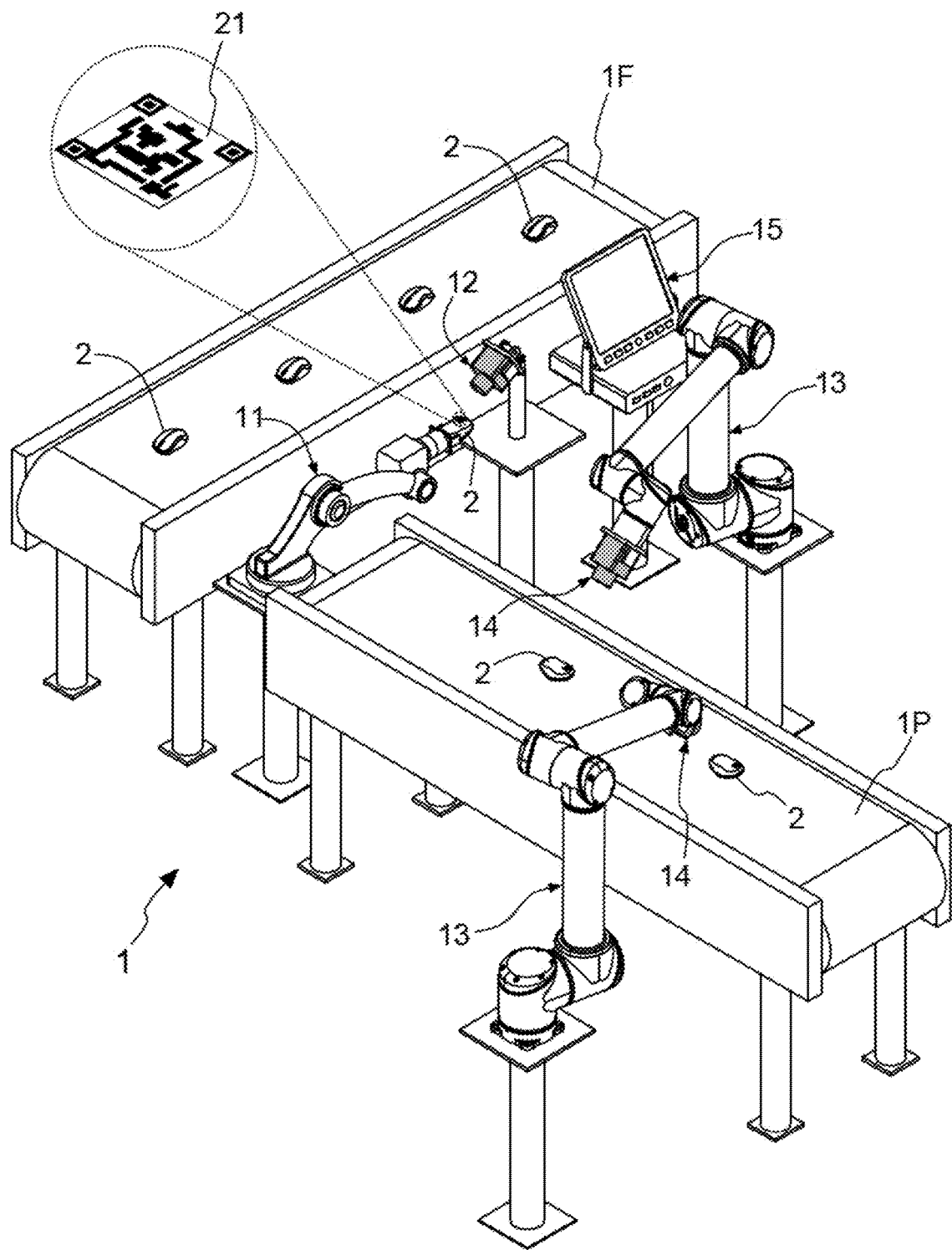
FIG. 2A shows a first schematic stereo diagram of an automatic target image acquisition and calibration system according to the present invention.
Figure 2B:
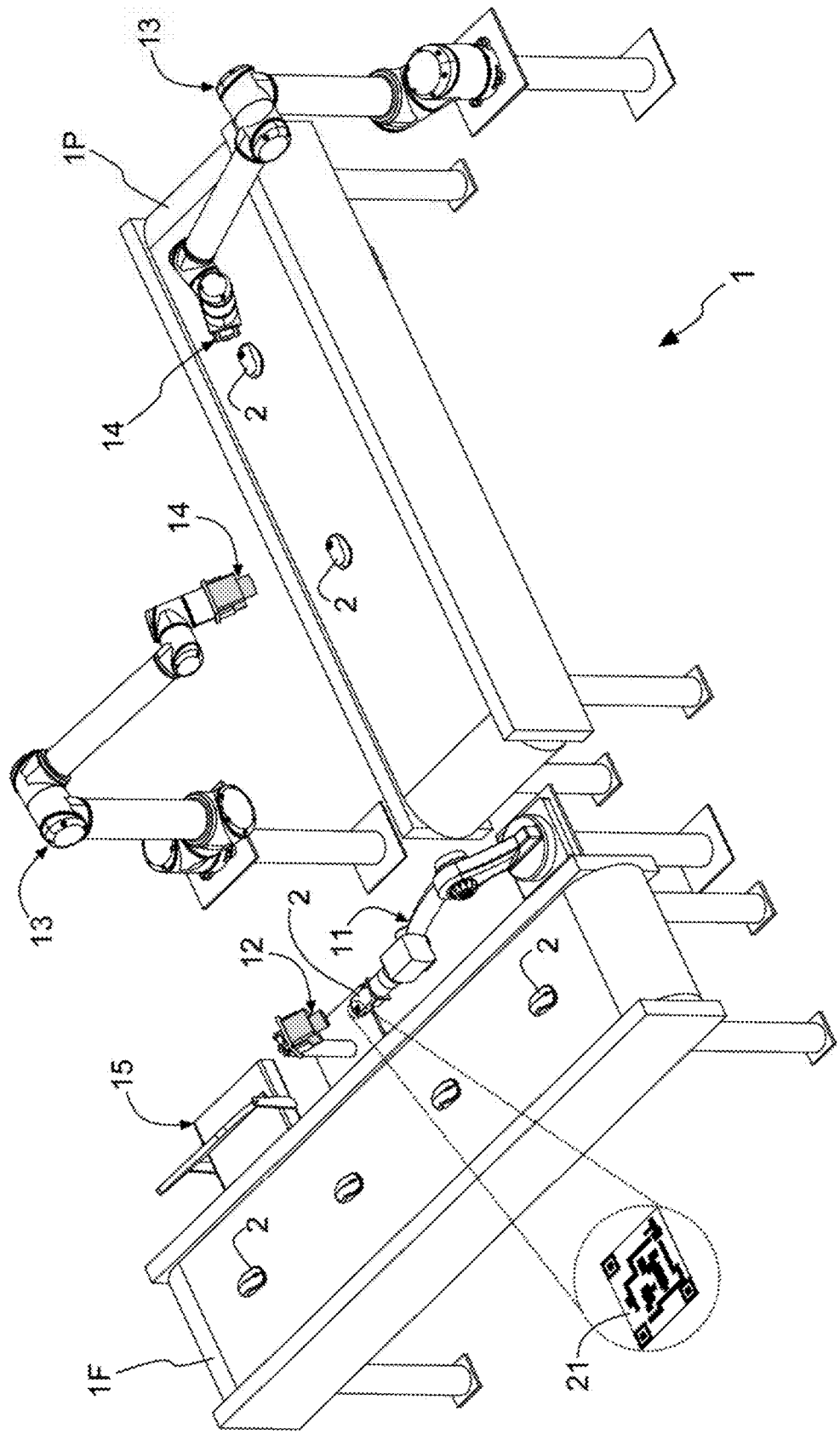
FIG. 2B shows a second schematic stereo diagram of the automatic target image acquisition and calibration system according to the present invention.

With reference to FIG. 2A and FIG. 2B, where a first schematic stereo diagram and a second schematic stereo diagram of an automatic target image acquisition and calibration system according to the present invention are provided. As FIG. 2A and FIG. 2B show, the present invention provides an automatic target image acquisition and calibration system for application in a defect inspection system, and the system 1 comprises: a first robotic arm 11, a first camera 12, at least one second robotic arm 13, and an electronic device 15. According to the present invention, the first robotic arm 11 is disposed near a first conveyor 1F and a second conveyor 1P, in which the first conveyor 1F transfers a plurality of articles 2, and at least one surface of said article 2 is provided with a recognition structure 21 thereon. In one practicable embodiment, the recognition structure 21 is a tag capable of storing an article information comprising vendor ID, product ID, serial number, and batch/lot number. Therefore, the tag can be, but is not limited to, a RFID tag, a 2D barcode tag, a QR code tag, a matrix barcode tag, a patterns-containing tag, a text-containing tag, a alphabets-containing tags, or a digits-containing tag.

In another one practicable embodiment, the recognition structure 21 is a laser marking (i.e., a structural feature) formed on one surface of the article 2 by operating a laser engraver, or is a label sticker patched on one surface of the article 2. Of course, the laser marking and the label sticker are both to contain the article information including vendor ID, product ID, serial number, and batch/lot number. According to the present invention, the recognition structure 21 is helpful in determining a body angle of the article 2.

Figure 3:
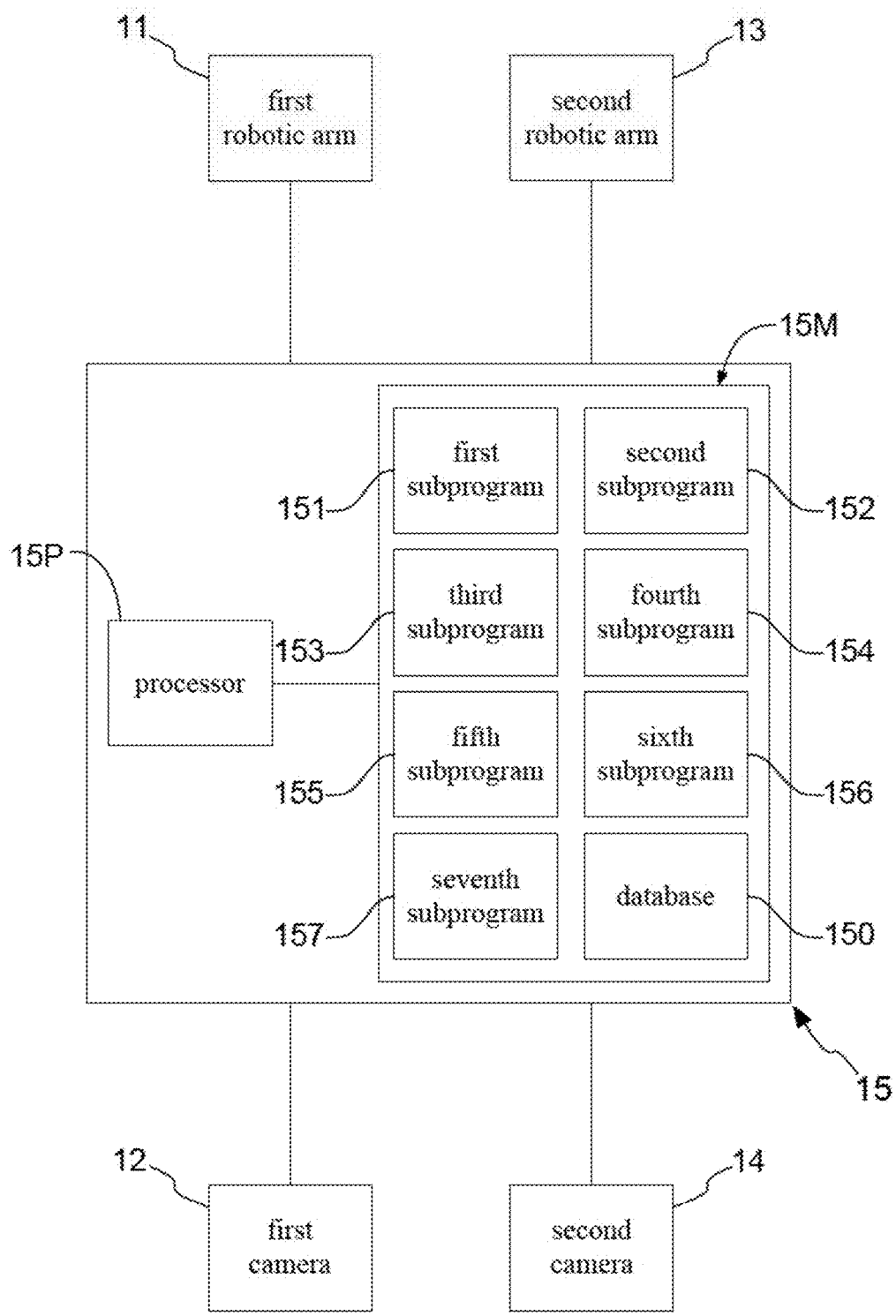
FIG. 3 shows a block diagram of the automatic target image acquisition and calibration system according to the present invention.

FIG. 3 shows a block diagram of the automatic target image acquisition and calibration system according to the present invention. As FIG. 2A and FIG. 2B show, the first camera 12 is disposed near the first robotic arm 11, and the at least one second robotic arm 13 is disposed near the second conveyor 1P, and grasps at least one second camera 14. As FIG. 3 shows, the electronic device 15 is coupled to the first robotic arm 11, the first camera 12, the at least one second robotic arm 13, and the at least one second camera 14, and comprises a processor 15P and a memory 15M. According to the present invention, the memory 15M stores an application program, and includes a database 150. Therefore, during the defect inspection system being operated to conduct visual inspections for the articles 2 transferred by the first conveyor 1F and a second conveyor 1P, the processor 15P executes the application program by accesses the memory 15M, so as to be configured to perform a plurality of functions. As FIG. 3 shows, the application program comprises multiple subprograms including a first subprogram 151, a second subprogram 152, a third subprogram 153, a fourth subprogram 154, a fifth subprogram 155, a sixth subprogram 156, and a seventh subprogram 157.

During the operation of the defect inspection system, the processor 15P executes the first subprogram 151 so as to be configured to control the first robotic arm 11 to grasp one article 2 from the first conveyor 1F, move the article 2 to be in a first photographing region of the first camera 12, and then turn over the article 2 in a rotation sequence. In case of the article 2 being turned over in said rotation sequence, the processor 15P executes the second subprogram 152 so as to be configured to control the first camera 12 to acquire a plurality of 2D images from the article 2. Subsequently, the processor 15P executes the third subprogram 153 so as to be configured to apply a feature recognition process to the plurality of 2D images, so as to find at least one 2D image including a recognition feature pattern. In other words, when the article 2 is transferred by the first conveyor 1F, the system 1 of the present invention turns over the article 2 in order to find a specific surface of the article 2, in which a recognition feature pattern is provided on the specific surface.

Continuously, after the first robotic arm 11 is controlled to move the article 2 to the second conveyor 1P, the processor 15P executes the fourth subprogram 154 so as to be configured to establish a 3D image of the article 2 based on the recognition feature pattern and the plurality of 2D images, therefore a relative position and a relative 3D coordinate of the article 2 is determined by the processor 15P. In one embodiment, the fourth subprogram 154 comprises instructions which includes a mathematical algorithm, such that the processor 15P completes the establishment of the 3D image and the calculation of the relative 3D coordinate. The mathematical algorithm can be, but is not limited to, Delaunay triangulation algorithm, Crust triangulation algorithm or triangulated irregular network (TIN) algorithm.

After generating the 3D image and acquiring the relative position and the relative 3D coordinate, the processor 15P executes the fifth subprogram 155 so as to be configured to conduct a camera moving operation, thereby controlling the robotic arm 13 to move the second camera 14 to make one of N inspection surfaces of the article 2 be in a second photographing region of the second camera 14, where N is an integer. Next, the processor 15P executes the six subprogram 156 so as to be configured the processor 15P to conduct a photographing operation, thereby controlling the second camera 14 to photograph the inspection surface of the article 2. Subsequently, the processor 15P repeats the foregoing camera moving operation and the foregoing photographing operation N−1 times, thereby eventually obtain a total of N article images. In general, an industrially made article (i.e., a product or a semi-finished product) has a top surface, a bottom surface, a left surface, a right surface, a front surface, and a bottom surface. Therefore, during applying a cosmetic test to the article, visual inspections for the six surfaces are carried out by an inspector according to international testing standards. From above explanations, it is understood that an article 2 generally has six inspection surfaces.

Consequently, the processor 15P executes the seventh subprogram 157 so as to be configured to apply a feature extracting process to the N article images so as to generate N feature images. Moreover, the processor 15P further conducts a feature matching operation, so as to determine whether said feature image contains at least one defect feature that matches at least one of a plurality of reference defect features.

Figure 4:
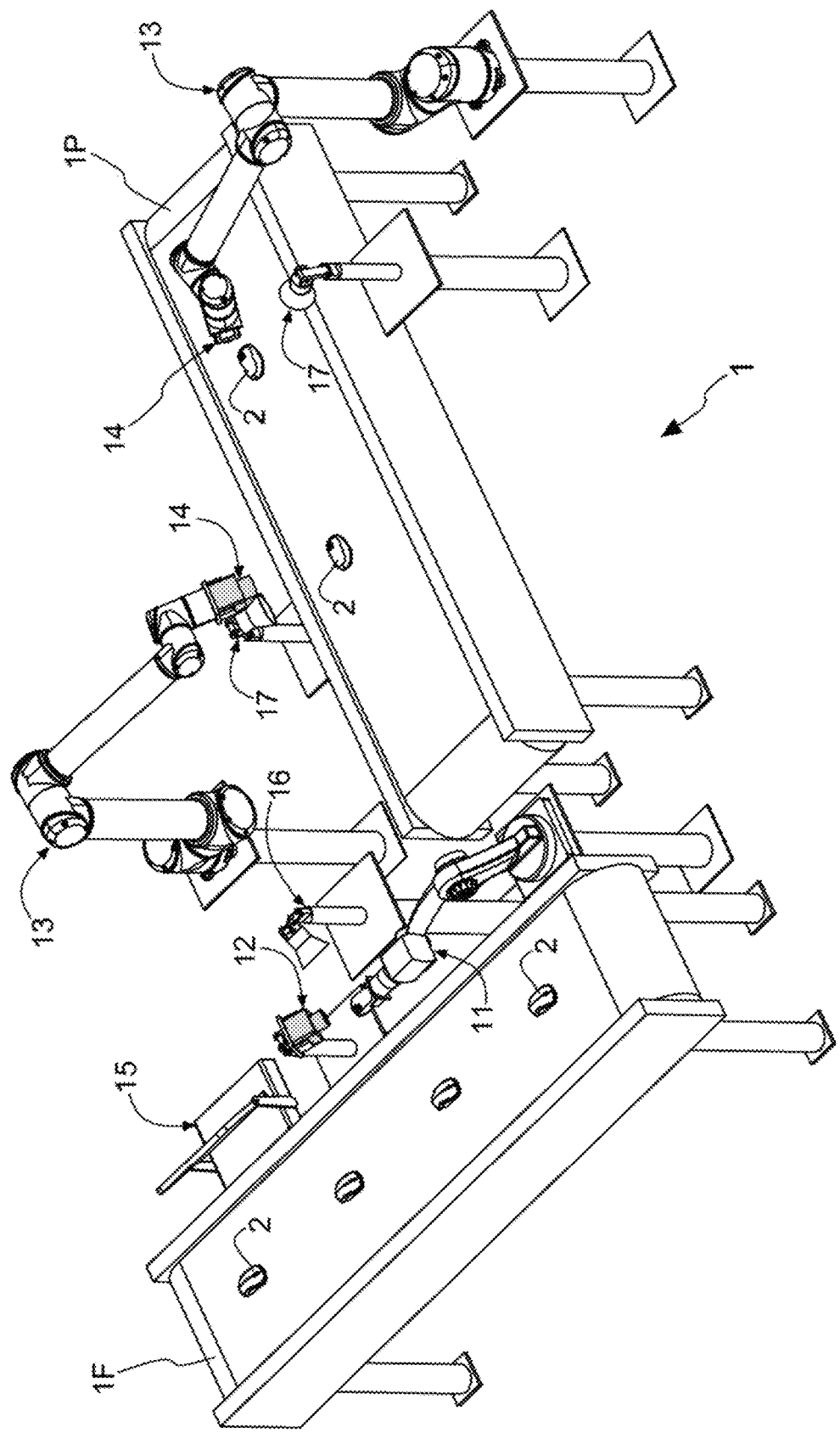
FIG. 4 shows a third schematic stereo diagram of the automatic target image acquisition and calibration system according to the present invention.

With reference to FIG. 4, where a third schematic stereo diagram of the automatic target image acquisition and calibration system according to the present invention is provided. As FIG. 4 shows, in a practicable embodiment, the system 1 further comprises a first light source 16, and a second light source 17, wherein the first light source 16 is coupled to the electronic device 15, and is controlled by the electronic device 15 so as to radiate a first illumination light to the first photographing region. Moreover, the second light source 17 is coupled to the electronic device 15, and is controlled by the electronic device 15 so as to radiate a second illumination light to the second photographing region.

It is worth further explaining that, in one embodiment, the electronic device is further coupled to an apparatus controlling device that is used for controlling the first conveyor 1F and the second conveyor 1P. However, in another one embodiment, the electronic device 15 is integrated in an apparatus controlling device that is used for controlling the first conveyor 1F and the second conveyor 1P.

Therefore, through above descriptions, all embodiments and their constituting elements of the automatic target image acquisition and calibration system according to the present invention have been introduced completely and clearly. Moreover, the above description is made on embodiments of the present invention. However, the embodiments are not intended to limit the scope of the present invention, and all equivalent implementations or alterations within the spirit of the present invention still fall within the scope of the present invention.

What is claimed is:

1. A system of automatic target image acquisition and calibration, comprising:
   a first robotic arm, being disposed near a first conveyor and a second conveyor, wherein the first conveyor transfers a plurality of articles, and at least one surface of said article being provided with a recognition structure thereon;
   a first camera, being disposed near the first robotic arm;
   at least one second robotic arm, being disposed near the second conveyor, and grasping at least one second camera; and
   an electronic device, being coupled to the first robotic arm, the first camera, the at least one second robotic arm, and the at least one second camera, and comprising a processor and a memory;
   wherein the memory stores an application program, and the processor accesses the memory so as to execute the application program;
   wherein when the application program is executed, the processor is configured to:
   control the first robotic arm to grasp one article from the first conveyor, move the article to be in a first photographing region of the first camera, and then turn over the article in a rotation sequence;
   control the first camera to acquire a plurality of 2D images from the article during the article being turned over;
   apply a feature recognition process to the plurality of 2D images, so as to find at least one 2D image including a recognition feature pattern;
   control the first robotic arm to move the article to the second conveyor, and determine a relative position and a relative 3D coordinate of the article based on the recognition feature pattern and the plurality of 2D images;
   conduct a camera moving operation, so as to control the robotic arm to move the second camera to make one of N inspection surfaces of the article be in a second photographing region of the second camera, where N is an integer;
   conduct a photographing operation, so as to control the second camera to photograph the inspection surface of the article, thereby obtaining one article image;
   repeat the foregoing camera moving operation and the foregoing photographing operation N−1 times, so as to obtain a total of N article images;
   apply a feature extracting process to the N article images so as to generate N feature images; and
   conduct a feature matching operation, so as to determine whether said feature image contains at least one defect feature that matches at least one of a plurality of reference defect features.

2. The system of claim 1, further comprising:
   a first light source, being coupled to the electronic device, and being controlled by the electronic device so as to radiate a first illumination light to the first photographing region; and
   a second light source, being coupled to the electronic device, and being controlled by the electronic device so as to radiate a second illumination light to the second photographing region.

3. The system of claim 1, wherein the recognition structure is a tag selected from the group consisting of RFID tag, 2D barcode tag, QR code tag, matrix barcode tag, patterns-containing tag, text-containing tag, alphabets-containing tags, and digits-containing tag.

4. The system of claim 1, wherein the recognition structure is a structural feature of the article.

5. The system of claim 3, wherein the tag is adopted for storing an article information comprising vendor ID, product ID, serial number, and batch/lot number.

6. The system of claim 1, wherein the application program comprises instructions, and the processor executes the instructions so as to be configured to establish a 3D image of the article based on the recognition feature pattern and the plurality of 2D images, and then to determine the relative position and the relative 3D coordinate of the article.

7. The system of claim 6, wherein the instructions include a mathematical algorithm selected from the group consisting of Delaunay triangulation algorithm, Crust triangulation algorithm, and triangulated irregular network (TIN) algorithm.

8. The system of claim 1, wherein the application program includes a plurality of subprograms, the plurality of subprograms comprising:
   a first subprogram, being compiled to be integrated in the application program by one type of programming language, and including instructions for configuring the processor to control the first robotic arm to grasp one article from the first conveyor, move the article to be in the first photographing region of the first camera, and turn over the article in said rotation sequence, and configuring the processor to control the first robotic arm to move the article to the second conveyor;
   a second subprogram, being compiled to be integrated in the application program by one type of programming language, and including instructions for configuring the processor to control the first camera to acquire the plurality of 2D images from the article during the article being turned over;
   a third subprogram, being compiled to be integrated in the application program by one type of programming language, and including instructions for configuring the processor to apply the feature recognition process to the plurality of 2D images, so as to find at least one 2D image including the recognition feature pattern;
   a fourth subprogram, being compiled to be integrated in the application program by one type of programming language, and including instructions for configuring the processor to establish a 3D image of the article based on the recognition feature pattern and the plurality of 2D images, and then to determine the relative position and the relative 3D coordinate of the article;
   a fifth subprogram, being compiled to be integrated in the application program by one type of programming language, and including instructions for configuring the processor to control the robotic arm to move the second camera, thereby making one of N inspection surfaces of the article be in the second photographing region of the second camera;
   a six subprogram, being compiled to be integrated in the application program by one type of programming language, and including instructions for configuring the processor to control the second camera to photograph the inspection surface of the article, thereby obtaining one article image; and
   a seventh subprogram, being compiled to be integrated in the application program by one type of programming language, and including instructions for configuring the processor to apply the feature extracting process to the N article images, and then to determine whether said feature image contains at least one defect feature that matches at least one of a plurality of reference defect features.

9. The system of claim 1, wherein the electronic device is further coupled to an apparatus controlling device that is used for controlling the first conveyor and the second conveyor.

10. The system of claim 1, wherein the electronic device is integrated in an apparatus controlling device that is used for controlling the first conveyor and the second conveyor.

* * * * *